United States Patent
Phelan et al.

(10) Patent No.: US 6,435,323 B2
(45) Date of Patent: Aug. 20, 2002

(54) DISTRIBUTED AERODYNAMIC AND MECHANICAL DAMPING OF CABLES WITH ACTIVE SMART CONTROL

(75) Inventors: R. Scott Phelan, Lubbock, TX (US); Partha P. Sarkar, Ames, IA (US); Kishor C. Mehta; Thomas B. Gardner, both of Lubbock, TX (US); Zhongshan Zhao, Houston, TX (US)

(73) Assignee: Texas Tech University, Lubbock, TX (US)

( * ) Notice: Subject to any disclaimer, the term of this patent is extended or adjusted under 35 U.S.C. 154(b) by 0 days.

(21) Appl. No.: 09/738,346

(22) Filed: Dec. 18, 2000

Related U.S. Application Data
(60) Provisional application No. 60/171,094, filed on Dec. 16, 1999.

(51) Int. Cl.[7] ................................................. F16F 7/10
(52) U.S. Cl. .................... 188/378; 188/267.1; 188/268; 188/381; 267/136; 174/42
(58) Field of Search .................... 267/140.15, 140.14, 267/136; 188/378, 267.1, 268, 381; 174/42, 40 R; 343/DIG. 1

(56) References Cited

U.S. PATENT DOCUMENTS

| | | | |
|---|---|---|---|
| 2,154,442 A | | 4/1939 | Diehl |
| 2,155,052 A | | 4/1939 | Byland |
| 2,469,167 A | | 5/1949 | Little |
| 2,714,161 A | | 7/1955 | Featherstum |
| 3,246,073 A | | 4/1966 | Bouche et al. |
| 3,553,345 A | * | 1/1971 | Edwards ...................... 188/381 |
| 3,733,923 A | | 5/1973 | Goodrich et al. |
| 3,780,207 A | | 12/1973 | Crosby et al. |
| 3,826,339 A | * | 7/1974 | Brokaw ...................... 188/381 |
| 4,620,060 A | * | 10/1986 | Perinetti ...................... 174/42 |
| 4,706,788 A | | 11/1987 | Inman et al. |
| 4,995,583 A | * | 2/1991 | De La Fuente ............. 248/636 |
| 5,005,678 A | * | 4/1991 | Julien et al. ................. 188/378 |
| 5,735,257 A | | 4/1998 | Walk |
| 5,801,329 A | * | 9/1998 | Schmidt ...................... 174/42 |
| 5,857,712 A | * | 1/1999 | Kato ........................... 285/49 |
| 6,138,998 A | * | 10/2000 | Parker et al. ............. 188/267.1 |
| 6,292,967 B1 | * | 9/2001 | Tabatabai et al. ............... 14/22 |

* cited by examiner

*Primary Examiner*—Jack Lavinder
*Assistant Examiner*—Mariano Sy
(74) *Attorney, Agent, or Firm*—Jones, Tullar & Cooper PC

(57) ABSTRACT

A system for the mitigation of cable stay vibrations, typically induced by wind and rain, utilizes a plurality of active damper bands positioned along the cable stay. Each damper band includes a shiftable mass and an energizing device for facilitating assisted shifting of the mass. A control assembly can actuate all or selected ones of the energizing devices in response to sensed magnitudes of cable stay vibration.

13 Claims, 3 Drawing Sheets

DISTRIBUTED AERODYNAMIC AND MECHANICAL DAMPING OF CABLES WITH ACTIVE SMART CONTROL

CROSS-REFERENCE TO RELATED APPLICATIONS

The subject patent application claims the benefit of U.S. Provisional Application Serial No. 60/171,094, which was filed on Dec. 16, 1999. The disclosure of that provisional application is hereby incorporated herein by reference. The subject patent application is also related to U.S. application No. 09/643,754, filed Aug. 28, 2000. The disclosure of that patent application is also hereby incorporated herein by reference.

FIELD OF THE INVENTION

The present invention is directed generally to the aerodynamic and mechanical damping of cable stays. More specifically, the present invention is directed to the aerodynamic and mechanical damping of cable stays by utilizing active devices. Most particularly, the present invention is directed to the structure and to the use and control of active aerodynamic damper bands applied to cable stays for the purpose of mitigation of wind/rain induced cable stay vibrations.

Current approaches to controlling large amplitude cable stay vibrations are passive. No active sensing or control mechanisms are utilized. The implementation of an active, smart cable vibration damping system is presented in the subject invention. The system of the present invention employs distributed aerodynamic rings along with small, embedded mechanical dampers, such as shiftable media, pendulums, and/or spring type inertial masses that may be energized using active smart control when the cable vibration reaches a threshold limit. Due to the extreme heights at which cables are mounted, efforts in active smart control are focused on low-maintenance damping techniques and low-cost cable modifications.

DESCRIPTION OF THE PRIOR ART

In recent years, large-amplitude cable stay vibrations have been observed on a number of bridges in the U.S. and abroad during relatively low wind speeds in the range of 7 to 14 m/s (15–30 mph), with and without the presence of rain. Rain and wind-induced cable stay vibration is an aerodynamic phenomenon that was relatively unknown and did not receive adequate attention from bridge designers thus resulting in the need for mitigation devices. Excessive vibrations are detrimental to the fatigue life of the cable stays and cause distractions to the passing motorists.

The vibration of cable stays is most prevalent during low wind speeds, below 14 m/s (30 mph), and accompanying moderate to heavy rain. In addition, vibrations may also occur at high wind speeds, above 22 m/s (50 mph), without rain. The cause of the vibration problem at low wind speeds with rain is believed to be the change in cross-sectional shape of the cable or cable stay that occurs when rain forms a rivulet along the cable. This modification of the cross section of the cable stay affects the aerodynamics of the cable stay, resulting in large vibrations at wind speeds well below known vortex shedding speeds for cylindrical cable stays in a specific vibration mode. Cable stay vibrations can be severe and have led to concerns that they are contributing to significant fatigue loads on the cables. At risk is the material that makes up the cable stay itself; as well as the anchorage devices.

Investigations at the Fred Hartman Bridge located at Baytown, Tex., and at the Veteran's Memorial Bridge located at Port Arthur, Tex. have shown the existence of a large number of rain/wind induced cable stay vibrations. Over 5000 five-minute "triggered" events of cable stay accelerations have been recorded in just over two years. "Triggered" events are recorded when a predetermined acceleration and/or wind speed threshold is exceeded. It has been noted that each individual cable seems to vibrate at a particular lower-mode shape, but typically not the first mode. For example, a long Fred Hartman stay cable, 183 m (601 ft) in length with a fundamental frequency of 0.65 Hz, vibrates predominately in the $3^{rd}$ mode and not in the first two. Similarly, a mid-size Fred Hartman stay cable, 87 m (286 ft) in length with a fundamental frequency of 1.2 Hz, was found to vibrate predominately in the $2^{nd}$ mode and not in the first.

Higher modes of vibration in the cables were also found on both the Fred Hartman and the Veterans's Memorial bridges. It is generally accepted, though unproven, that cables vibrating in lower modes cause more damage than cables vibrating in higher modes, since lower-mode vibrations generally cause larger displacements. However, it is entirely possible that higher mode vibrations occur often enough to produce significant fatigue loadings on the stay cables due to cycles of reversed stressing.

Considering the physics of the rivulet formation, it is difficult to conceive that the rivulet is consistently located at the most critical location along the full cable length; there is lack of full-scale information. It is possible that the rivulet that primarily causes the vibration at the lower wind speeds forms at the critical location only over a partial cable length. This could explain why there is a preference for certain lower-modes to vibrate.

Currently, cable stay oscillations caused by wind/rain induced aerodynamic forces are controlled by one, or by a combination, of the following methods: 1) single-point mechanical dampers, typically at the base of each cable, 2) restraining cable devices connecting adjacent cables at various locations along the length of the cable, resulting in a reduced effective length for each cable and/or 3) aerodynamic damping approaches such as grooves, protuberances or circular rings. The former two methods are considered concentrated damping mechanisms, while the latter is considered distributive.

For a distributed mitigation device, such as the aerodynamic rings, it is possible to completely solve the vibration problem by installing the rings only on a partial length of the cable-and not along the full cable length. A distributed aerodynamic ring system will be effective in eliminating significant vibrations in all vibration modes, unlike a linear mechanical damper (hydraulic) that is optimized to be effective for a single mode.

Mechanical dampers generally are linear viscous mechanisms, somewhat similar to an automobile shock absorber. However, they also can be non-linear, computer-controlled mechanisms. Mechanical dampers are a proven technology and are relatively easy to install. However, they generally are: 1) expensive systems-and can be expensive to install, 2) may need periodic maintenance, and 3) typically require substantial cable stay displacements to occur before the damping mechanism becomes functional.

Restrainers are employed to tie adjacent cable stays together at discrete points along the cable. Restrainers generally are effective solutions, as one cable adjacent to another oscillating cable generally will not be oscillating.

For cases when adjacent cables do oscillate together, many times they will vibrate out of phase or in different modes from each other. In these cases, restrainers are able to utilize the stiffness of adjacent cables to prevent a particular cable from oscillating. If the restrainer is unable to prevent oscillations, it continues to be considered beneficial in that it causes the cable stay to vibrate at higher modes as it "fixes" intermediate nodal points. Again, though a higher mode vibration is visually less dramatic, significant fatigue loadings can occur. Restrainers also are a proven technology. However, they are fairly difficult to install—particularly at cable stay heights generally required. Also, restrainers have had problems due to failure through loosening of attachments to the cable stays.

Although mechanical dampers are more popular, aerodynamic devices have certain advantages. They can be very effective over a wide range of wind speeds, and perform even better at high wind speeds, if properly designed. These aerodynamic devices are generally cost-effective and demand little maintenance efforts, thus they can function reliably. They can also be designed to be aesthetically pleasing; and reduce the effect of the aerodynamic forces before the cable begins to vibrate, where mechanical devices must dissipate energy of the cables that are already vibrating.

Various forms of aerodynamic solutions to the vibrations of smooth-surfaced, circular cable have been sought. While some can be adopted only at the design stage, others are feasible for retrofitting as well. Aerodynamic countermeasures usually modify the surface of the cable cross section to improve its aerodynamic performance in terms of reducing the excitation from the moving air or increasing the aerodynamic damping. Three examples of generally known types of cable surface/cross section modifications are surface dimpling, parallel axial protuberances, and elliptical plates. The elliptical plates were found to be the most effective of the three types of cable modifications. A variation of the elliptical plate is the helical strake, which has been used successfully on chimneys to reduce vortex-induces vibrations.

While the prior art has utilized various so-called passive devices to attempt to mitigate the effects of wind/rain induced cable stay vibrations, a need still exists for additional solutions. These new and different solutions will overcome the limitation of the prior art devices.

SUMMARY OF THE INVENTION

It is an object of the present invention to provide an active system for cable stay vibration mitigation.

Another object of the present invention is to provide an active smart control system for cable stay vibration mitigation using distributed aerodynamic rings.

Still a further object of the present invention is to provide a smart control system using aerodynamic rings with embedded mechanical dampers.

Yet another object of the present invention is to provide aerodynamic rings having embedded mechanical dampers that are energized using active smart control when cable vibrations reach a threshold value.

As will be set forth in greater detail in the description of the preferred embodiment, which are presented subsequently, the distributed aerodynamic and mechanical damping of cables with active smart control, in accordance with the present invention utilizes a plurality of aerodynamic damper bands or rings that are positionable at spaced lengths along the cable stay to be dampened. Each damper band has an outer, aerodynamic shape and a hollow or partially hollow interior. The interior of the damper band is provided with active mechanical dampers. These can take the form of shiftable weights, pendulums, spring type inertial masses and other movable or shiftable bodies. In one embodiment of the present invention, these active, shiftable masses are characterized as active, "smart" masses. This means that they are caused to shift by a control system that senses cable vibrations or oscillations above a threshold level and then activates the shiftable masses in a manner which will effectively counteract the cable or cable stay vibrations or oscillations.

The system of aerodynamic and mechanical damping of cables with active smart control, in accordance with the present invention, provides superior damping of cable stay vibration with less cable fatigue. It also will reduce the number of required aerodynamic damper bands or rings required for each cable. A further benefit of the subject invention is its ability to eliminate ice build-up on the cable stays. An additional benefit is the provision of innovative aesthetic treatments to the overall bridge structure.

The active smart control system of the present invention is directed primarily for use with a distributed aerodynamic ring or band system It is also usable for a computer-controlled single point mechanical damper system which could be used either by itself or in combination with an aerodynamic ring or damper band system.

The distributed aerodynamic and mechanical damping of cables with active smart control in accordance with the present invention overcomes the limitations of the prior art device. It represents a substantial advance in the field.

BRIEF DESCRIPTION OF THE DRAWINGS

While the novel features of the distributed aerodynamic and mechanical damping of cables with active smart control in accordance with the present invention are set forth with particularity in the appended claims, a full and complete understanding of the invention may be had by referring to the detailed description of the preferred embodiments, as will be set forth subsequently, and by referring to the accompanying drawings, in which:

DESCRIPTION OF THE PREFERRED EMBODIMENTS

In our prior U.S. patent application Ser. No. 09/643,754, filed Aug. 28, 2000, which prior patent application is referenced previously in this patent application, and which is hereby expressly incorporated by references herein, the structure and useage of passive aerodynamic damper bands has been discussed in detail. These bands are passive in nature since they are secured to the cable stays of a bridge and depend on their aerodynamic shape to mitigate cable stay vibrations which are caused by wind and rain. The devices and systems of the present invention, while incorporating and utilizing the benefits of the aerodynamic damper bands of the previous invention, also provide active control devices and systems that will even more effectively dampen wind and rain induced cable stay vibrations.

Figure 1:
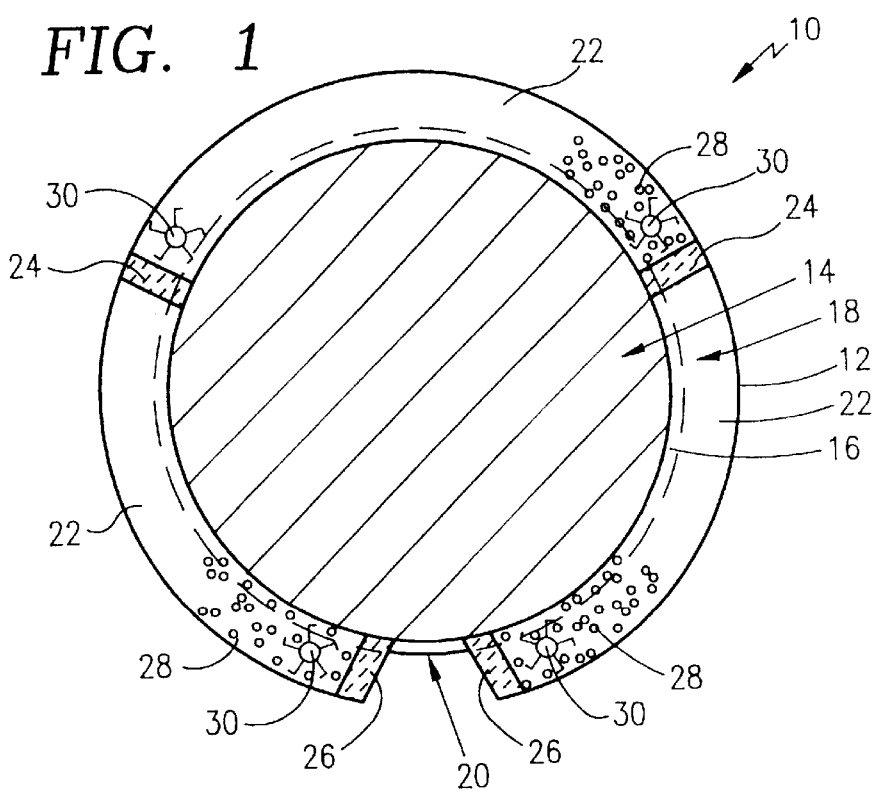
FIG. 1 is a cross-sectional schematic view of a first preferred embodiment of an aerodynamic ring with a shiftable mass in accordance with the present invention.

Referring initially to FIG. 1, there may be seen generally at 10 a first preferred embodiment of an active damper band in accordance with the present invention. This active damper band 10 is similar in overall shape to the damper bands described in the above-referenced prior U.S. patent application. A flexible ring or band 12 is securable about the outer circumference of a cable stay 14. An integral securement strap or other suitable securement device 16, which is depicted in dashed lines in FIG. 1, is incorporated in, or is inserted through the hollow interior portion 18 of the flexible band 12. Ends of the securement straps 16 are connected to each other as schematically depicted at 20 in FIG. 1. It will be understood that the flexible ring 12 can be made of any suitable plastic or similar flexible yet weather resistant material and that the securement straps 16 could be a wire tie or another similar type of quick connecting device that would lend itself to quick field assembly, either by manual or by mechanical means.

The hollow interior 18 of the flexible ring 12 of the first preferred embodiment of the active damper band in accordance with the present invention, is preferably divided into several shiftable mass receiving chambers, with three such chambers 22 being depicted in FIG. 1. A pair of interior barriers 24 and two end barriers 26 are positioned in the interior 18 of the flexible band or ring 12 to define the separate shiftable mass receiving chambers 22.

Each shiftable mass receiving chamber 22 is partially filled with a shiftable mass 28. This shiftable mass 28 is preferably a viscous fluid or another flowable material that can shift locations in its shiftable mass chamber 22 either passively; i.e. solely due to movement of the damper band, or actively. The free space within each chamber 22 can be either filled with air or can be maintained under a vacuum. A suitable energizing device 30, or several such energizing devices 30 can be placed in each of the shiftable mass chambers 22, as may be seen in FIG. 1. Each such energizing device 30 could be a small impeller driven by an electrically powered micro motor which is not specifically illustrated. As will be discussed shortly, if the system is a smart system, the energizing devices will be controlled for selective operation to shift the shiftable mass 28 in each chamber 22 so as to counteract the movement of the cable stay. If the shiftable mass 28 is moved solely as a result of the shifting of the cable stay, it will still tend to counteract the shifting or oscillating movement of the cable stay. For example, if the cable stay 14 depicted in FIG. 1 is caused by wind and rain, to shift to the right, the shiftable mass 28 in the upper chamber 22 will tend to travel to the left side of the upper chamber 22. If the damping system is an active system, the energizing device 30 at the right end of the upper chamber 22 can be activated to more rapidly shift the shiftable mass 28 from the right side of the upper chamber 22 to the left side of the upper chamber 22. If the system is an active smart system, only selected ones of the energizing devices 30 may be operated with the decision of which devices 30 to be operated depending on which cables stays are vibrating, as well as the magnitude of each vibration. The result, whether the shiftable mass is caused to move either solely by reacting to the movement of the cable stay, or also as a result of the operation of the energizing device 30, is to dampen the cable stay oscillations. The energizing devices 30 will preferably be electrically powered through suitable electric leads that are not specifically shown in FIG. 1 of the drawings. Such electric power can also be used to operate small heating elements, also not specifically shown, that could be incorporated into the walls of the flexible rings 12. Such heating elements would be effective in heating the damping rings 12 to eliminate possible ice buildup on the outer surfaces of the flexible rings 12.

Figure 2:
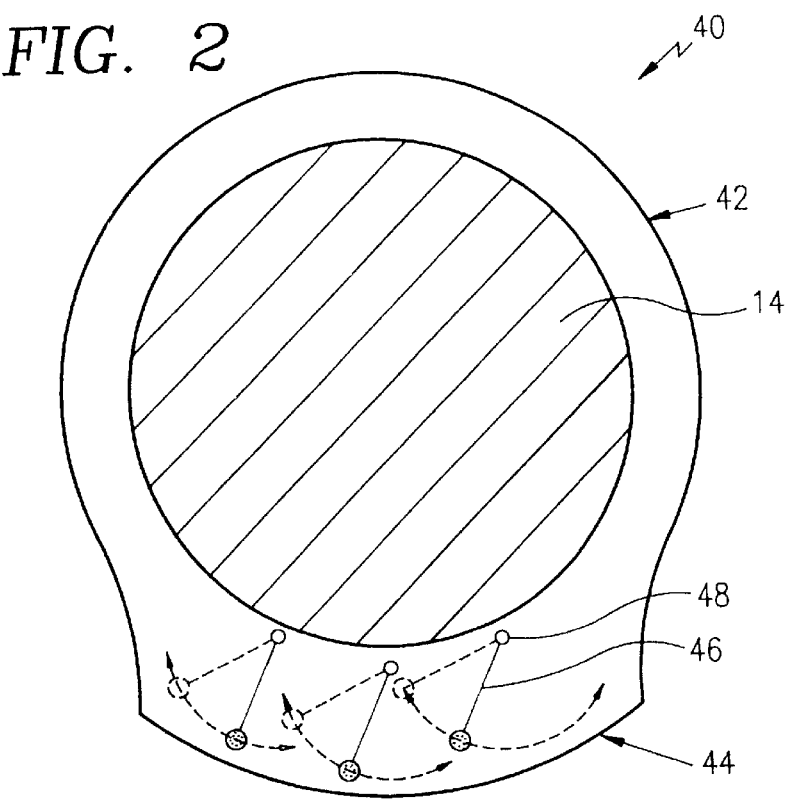
FIG. 2 is a cross-sectional schematic view of a second preferred embodiment of an aerodynamic ring with a shiftable mass.

Turning now to FIG. 2 there is shown, generally at 40 a second preferred embodiment of an active damper band or ring in accordance with the present invention. This active damper band 40 is again secured about an outer surface of a cable stay 14 and has an aerodynamic shape similar to the flexible ring 12 described in connection with FIG. 1. This damper band 40 can be comprised of several hinge-connected sections, or can be fabricated as a single ring of a suitable metal or other material. The circular body 42 of the damper band 40 is provided with at least one bulge or enlarged area 44. In the depiction of the active damper band 40 shown in FIG. 2, there is one bulge 44 and it is located at the lower portion of the circular band body 42. Location of this bulge 44 at other orientations, as well as the provision of more than a sole bulge 44 is within the purview of the subject invention. A shiftable mass is provided in the bulge or bulges 44 formed in the band body 42 of the second preferred embodiment 40 of the active damper band in accordance with the present invention. This shiftable mass takes the form of one or a plurality of pendulums 46, each of which is supported for pivotable movement by a support shaft 48. As was the case with the first embodiment 10 of the active damper band described previously, the shiftable mass; i.e. the pendulum or pendulums 46 placed in the bulge or bulges 44 of the band body 42 of the second preferred embodiment 40 of the active damper band can be excited either passively as a result of a response to shifting of the cable due to wind and rain induced oscillations, or can be excited actively. In the latter situation, the pendulum supporting shaft or shafts 48 are the energizing mechanism and can be caused to pivot by suitable electrically operated devices, such as micro motors, that are not specifically shown. If the system is an active smart system, again as will be discussed shortly, the energizing mechanisms can be caused to shift the pendulum or pendulums in advance of a shifting or a similar movement that the cable or cable stay 14 is sensed to be about to make. In this second embodiment, as in the first, the shiftable mass is shifted in a direction in opposition to the movement of the cable stay to which the active damper band is attached. Such an opposing shifting of the shiftable mass 28 or 46 in the active damper band 12 or 42, respectively, will dampen the oscillation of the cable stay 14.

In both of the two embodiments of an active damper band discussed above, the bands are placed on the exterior surface of the cable or cable stay 14. This is primarily a retro-fit arrangement, or one where an accomplishment of aerodynamic damping is important in conjunction with the damping provided by the shiftable mass. In new construction, the shiftable mass could be placed interiorly of the cable stay. Since a cable stay is typically a sheath that is placed about a group or bundle of individual cables and in which void areas are filled with a settable material, it will be possible to place the shiftable masses typically still in the above-described bands, within the cable stay. While this may lead to an increased overall cable stay diameter, it preserves a smooth exterior surface that is less apt to experience ice buildup. Of course, the location of the damper bands inside the cable stay will eliminate any aerodynamic benefit provided by exteriorly mounted bands. In such a situation of interior bands and shiftable masses, active control of the shiftable masses and particularly active smart control of the shiftable masses becomes the mechanism by which oscillations of the cable stay are counteracted.

The most effective damping of cable stay vibration and oscillations may well entail some combination of the several mechanical and aerodynamic device discussed above. For instance, it may well be that a solution could include an exteriorly positioned active damper band having an aerodynamic shape. The damper band could include right and left chambers such as chambers 22 discussed in connection with the damper band 10 of FIG. 1, with their shiftable masses 28 and included paddle wheel type energizing devices 30. A pendulum 46 or a plurality of pendulums 46, as shown in FIG. 2 could also be incorporated into the same active damper band. The shiftable masses 28 on the left and right sides of the damper band would control vertical oscillations of the cable stay 14. It is quite possible that no operation of the energizing devices such as the paddle wheels 30 will be required with acceleration forces of >1 g. If the acceleration is <1 g the energizing paddle wheels 30 may be used. Similarly, if the pendulum is to be effective at accelerations <1 g, it is quite likely that the energizing device for the pendulum, such as the rotatable pendulum support shaft 48 may be required to be operated.

Figure 3:
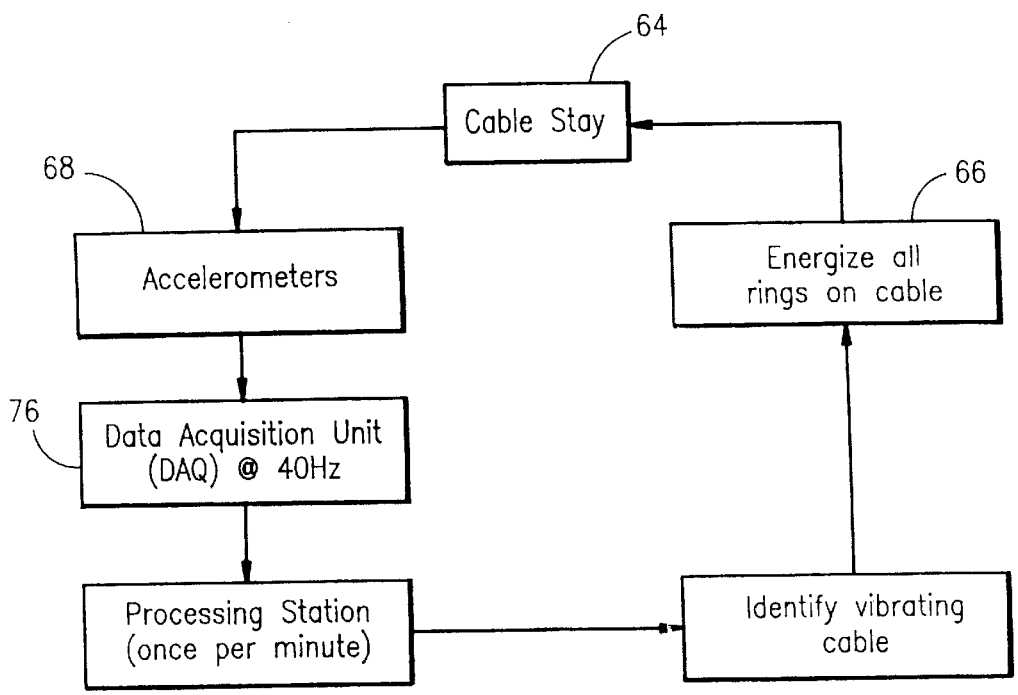
FIG. 3 is a block diagram of an active control system for a shiftable mass dampening system in accordance with the present invention.
Figure 4:
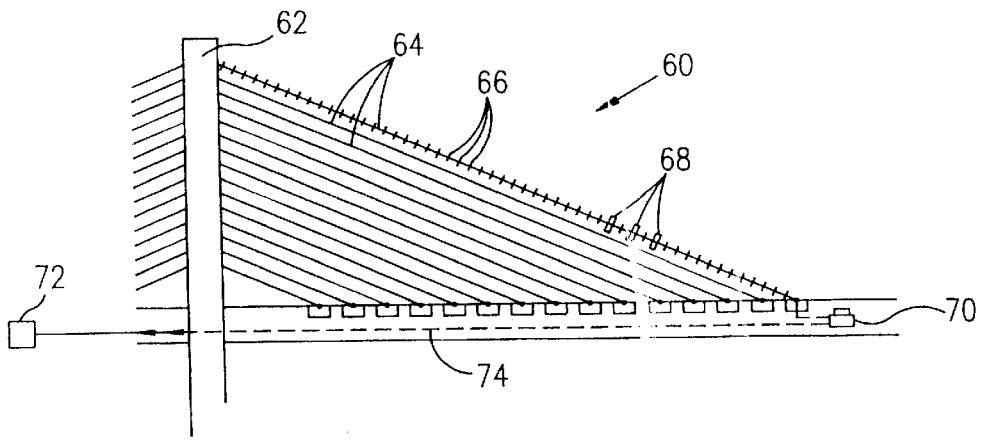
FIG. 4 is a schematic side elevation view of a portion of a bridge with active aerodynamic damping rings on one cable stay.

Turning now to FIGS. 3 and 4 there is schematically depicted what will be referred to an "active" or "active only" system that is useable to counteract and to dampen wind and rain induced vibrations and oscillations in the cable stays of a bridge. Referring initially to FIG. 4, there is schematically depicted a portion of a bridge, generally at 60. The bridge 60 is constructed with generally well known towers 62 and a plurality of cable stays 64. An outer or upper one of these cable stays 64 is shown as being provided with a number of active damper bands 66 spaced along its length in accordance with the spacing parameters discussed in detail in the inventors' prior application. This cable damper band spacing is preferably three times the cable stay diameter or 3D. Several of the active damper bands are also provided with embedded accelerometers. These accelerometer bands are denoted at 68 in FIG. 4. The damper bands 66 and 68 are all electrically connected to a remote processing station 70 by suitable leads which are not shown in detail. The remote processing station 70 is joined to a central power communication and processing station generally at 72 by suitable power and communication lines 74. In operation in the active mode, as shown in the schematic diagram of FIG. 3, the accelerometer receiving bands 68 will sense oscillations, vibrations or other movement in the cable stay 64 to which they are attached. It will be understood that the damper bands 66 of the present invention are typically attached to all or the bulk of the cable stays 64, not merely to the outermost one, as depicted in FIG. 4. The accelerometers provide their readings to the remote processing station 70 which includes a suitable data acquisition unit 76, as shown in FIG. 3. The data is received by the remote processing station 70, and is transferred to the central processing station 72. The particular cable stay or cable stays 64 which are being caused to oscillate are identified. In response, all of the active damper bands 66 on the particular cable stay or cable stays 64 are energized. This results in a shifting of the shiftable masses in each of the damper bands 66. As discussed previously, the operation of the energizing devices, either 30 or 48 may occur at cable stay acceleration levels only within specific ranges. If the cable stays are being subjected to acceleration forces above 1 g, for example, the operation of the energizing devices may be unnecessary. The forces imparted to the shiftable masses by these high cable stay acceleration forces will be sufficient to properly shift the shiftable masses to counteract the cable stay oscillations without the assistance of the energizing devices. If the cable stay oscillations, as measured by the accelerometer carrying damper bands 68 is below, for example 1 g, then it may be appropriate to operate the energizing devices 30 or 48 to aid in the dampening movement of the shiftable masses 28 or 46.

Figure 5:
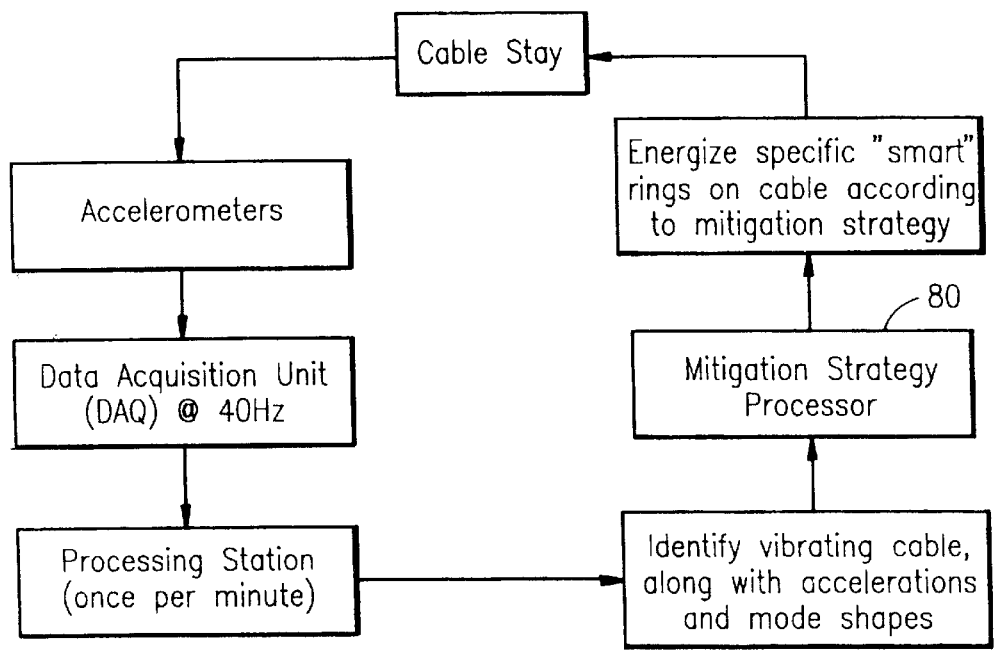
FIG. 5 is a block diagram of an active smart control system for a shiftable mass damping system.
Figure 6:
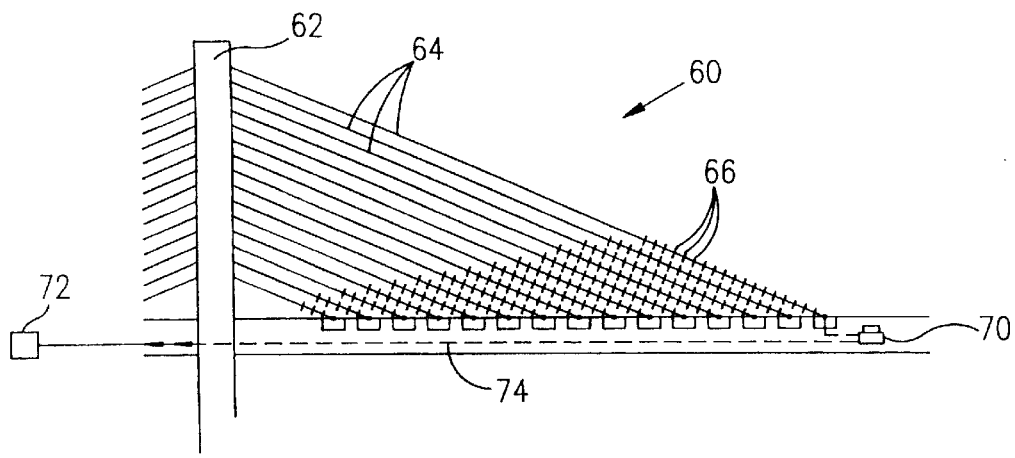
FIG. 6 is a schematic side elevation view of a portion of a bridge with a plurality of smart active aerodynamic damping rings arranged on a plurality of cables.

A more sophisticated, smart active system of cable stay oscillation damping, in accordance with the present invention, is depicted in FIGS. 5 and 6 in which similar structures are identified by the same reference numerals. In this smart active system, the central power communication and processing station 72 is able to energize selected ones of the smart active rings on individual cables, again based on readings provided by special accelerometer bearing ones of the active damper bands 66 that are mounted on the plurality of cable stays 64. Since the smart active system is more effective in damping cable stay oscillations, it is possible that the active damper bands will need to be placed on only the lower third of the length of the longer cable stays and only on the lower half of the length of the shorter cable stays, as depicted schematically in FIG. 6. Similarly, since the smart active system will be more effective than the active or active only system, it is likely that a damper band spacing of four times the cable stay diameter, or 4D may be sufficient.

As shown in the schematic diagram of FIG. 5, the cable stay oscillations are sensed by the accelerometer carrying active damper bands and the data is sent to the central processing station. In the smart active system, a mitigation strategy processor 80 is included in the central processing station. This processor 80 reviews the input from the accelerometer carrying active damper bands and implements a strategy of activation of energizing devices in selected ones of the active damper bands in a manner that will be most effective in eliminating cable stay oscillations. It is a requirement of such a smart active system that each damper band would be specifically identifiable to the controlling system and would be individually and particularly energized for damping, where needed. As with the previously discussed active system, electrical energy could be supplied to all of the damper bands for the purpose of heating the damper bands to prevent ice buildup along the cable stay.

A method for the distributed aerodynamic and mechanical damping of cable stay oscillations using active devices has been set forth fully and completely hereinabove. Both of the shiftable masses are well suited for use with active control technology and are effective in damping cable stay oscillations. Other applications to other areas, such as the damping of elongated supports situated in bodies of water, such as, for example, the stabilization of offshore oil drilling rigs and production platforms is also within the scope of the subject invention. It will be apparent to one of skill in the art that various changes in, for example the specific sizes and associated fluid densities of the cable stays and damper bands, the particular bridge or platform structure, and the like could be made without departing from the true spirit and scope of the present invention which is accordingly, to be limited only by the appended claims.

What is claimed is:

1. An active cable damping device comprising:
   a cable damper band adapted to be positioned about a cable subject to oscillations, said cable damper band having a hollow interior;
   a shiftable mass supported for movement in said hollow interior of said cable damper band, said shiftable mass being movable in said hollow interior of said cable damper band in response to oscillations of the cable; and
   an energizing device positioned in said cable damper band and being operable to effect said movement of said shiftable mass in said hollow interior of said cable damper band independently of oscillations of the cable.

2. The active cable damping device of claim 1 wherein said cable damper band includes a plurality of shiftable mass receiving chambers.

3. The active cable damping device of claim 2 wherein each of said shiftable mass receiving chambers includes at least one of said energizing devices.

4. The active cable damping device of claim 1 wherein said shiftable mass is a viscous fluid.

5. The active cable damping device of claim 2 wherein said energizing device is a rotatable paddlewheel.

6. The active cable damping device of claim 1 wherein said shiftable mass is at lease one pendulum.

7. The active cable damping device of claim 6 wherein each said at least one pendulum is supported for movement by a pendulum support shaft.

8. The active cable damping device of claim 7 further wherein said energizing device includes means to rotate each said pendulum support shaft.

9. The active cable damping device of claim 1 wherein said cable damper band is provided with an aerodynamic outer shape.

10. A method for controlling cable oscillations including:
    providing a cable oscillation damper band having a hollow interior;
    positioning a shiftable mass and a shiftable mass energizing device within said hollow interior;
    securing said cable oscillation damper band about a cable subject to oscillations;
    sensing oscillations in the cable;
    actuating said shiftable mass energizing device in response to said sensed oscillations in the cable; and
    using said energizing device to shift said shiftable mass in said hollow interior of said damper band to counteract the oscillations in the cable.

11. An active cable damping device comprising:
    a cable damper band adapted to be positioned on a cable subject to oscillations, said cable damper band including a plurality of shiftable mass receiving chambers;
    a shiftable mass supported for movement in said cable damper band in response to oscillations of the cable; and
    an energizing device positioned in said cable damper band and being operable to effect shifting of said shiftable mass in said cable damper band independently of oscillations of the cable.

12. The active cable damping device of claim 11 wherein each of said shiftable mass receiving chambers includes at least one of said energizing devices.

13. The active cable damping device of claim 11 wherein said energizing device is a rotatable paddlewheel.

* * * * *